United States Patent
Niitsuma et al.

(10) Patent No.: US 11,094,478 B2
(45) Date of Patent: Aug. 17, 2021

(54) CLAD MATERIAL FOR ELECTRIC CONTACTS AND METHOD FOR PRODUCING THE CLAD MATERIAL

(71) Applicant: TANAKA KIKINZOKU KOGYO K.K., Tokyo (JP)

(72) Inventors: Takumi Niitsuma, Oshu (JP); Yoshinori Aoyama, Hiratsuka (JP); Junichi Takeuchi, Oshu (JP); Ryuta Ido, Oshu (JP); Hideya Takahashi, Oshu (JP)

(73) Assignee: TANAKA KIKINZOKU KOGYO K.K., Tokyo (JP)

( * ) Notice: Subject to any disclaimer, the term of this patent is extended or adjusted under 35 U.S.C. 154(b) by 302 days.

(21) Appl. No.: 16/095,217

(22) PCT Filed: May 19, 2017

(86) PCT No.: PCT/JP2017/018927
§ 371 (c)(1),
(2) Date: Oct. 19, 2018

(87) PCT Pub. No.: WO2017/204129
PCT Pub. Date: Nov. 30, 2017

(65) Prior Publication Data
US 2019/0139721 A1    May 9, 2019

(30) Foreign Application Priority Data
May 23, 2016 (JP) .............................. JP2016-102422

(51) Int. Cl.
*H01H 11/04* (2006.01)
*B32B 15/20* (2006.01)
(Continued)

(52) U.S. Cl.
CPC ......... *H01H 11/041* (2013.01); *B32B 15/018* (2013.01); *B32B 15/20* (2013.01);
(Continued)

(58) Field of Classification Search
CPC .................................................. H01H 11/041
(Continued)

(56) References Cited

U.S. PATENT DOCUMENTS

2014/0201999 A1    7/2014  Kita et al.
2015/0054613 A1*   2/2015  Sakaguchi ........... H01H 85/143
                                                                    337/111

FOREIGN PATENT DOCUMENTS

JP          53-1856 A      1/1978
JP          3-162553 A     7/1991
(Continued)

*Primary Examiner* — Coris Fung
*Assistant Examiner* — Danielle Carda
(74) *Attorney, Agent, or Firm* — Orrick, Herrington & Sutcliffe LLP; Joseph A. Calvaruso; K. Patrick Herman

(57) ABSTRACT

The present invention is a clad material for an electric contact, including a base material composed of a Cu-based, precipitation-type age-hardening material, and a contact material composed of an Ag alloy bonded to the base material. On a bonded interface between the contact material and the base material, a width of a diffusion region including Ag and Cu is 2.0 μm or shorter. The clad material is produced by bonding each other the contact material and the base material having undergone solutionizing and age-hardening beforehand, suppressing the diffusion region from expanding after bonding. The present invention is capable of providing an electric contact, which achieves higher conductivity, without sacrificing property of the Cu-based, precipitation-type age-hardening material.

11 Claims, 3 Drawing Sheets

(51) Int. Cl.
    *C22C 5/06*    (2006.01)
    *C22C 9/06*    (2006.01)
    *C22F 1/08*    (2006.01)
    *H01H 1/04*    (2006.01)
    *C22C 9/00*    (2006.01)
    *C22C 21/00*   (2006.01)
    *C22C 30/02*   (2006.01)
    *C22C 5/08*    (2006.01)
    *C22F 1/14*    (2006.01)
    *B32B 15/01*   (2006.01)
    *H01H 1/023*   (2006.01)
    *H01H 1/025*   (2006.01)

(52) U.S. Cl.
    CPC .......... *C22C 5/06* (2013.01); *C22C 5/08* (2013.01); *C22C 9/00* (2013.01); *C22C 9/06* (2013.01); *C22C 21/00* (2013.01); *C22C 30/02* (2013.01); *C22F 1/08* (2013.01); *C22F 1/14* (2013.01); *H01H 1/023* (2013.01); *H01H 1/025* (2013.01); *H01H 1/04* (2013.01); *H01H 11/04* (2013.01)

(58) Field of Classification Search
    USPC .......................................... 148/536
    See application file for complete search history.

(56) References Cited

FOREIGN PATENT DOCUMENTS

| | | |
|---|---|---|
| JP | 5-120950 A | 5/1993 |
| JP | 2012-221631 A | 11/2012 |
| JP | 2013-30475 A | 2/2013 |

\* cited by examiner

Example 1

Diffusion region: 1μm

Comparative example 1

Diffusion region: 6μm

US 11,094,478 B2

CLAD MATERIAL FOR ELECTRIC CONTACTS AND METHOD FOR PRODUCING THE CLAD MATERIAL

TECHNICAL FIELD

The present invention relates to a clad material for electric contact, including a base material composed of an age-precipitation type Cu alloy, and a contact material composed of an Ag alloy bonded to the base material, and a method for producing the clad material for electric contact.

BACKGROUND ART

Such a conventional contact material that has a clad structure is known and used for opening/closing contacts used in opening/closing breakers and opening/closing switches, for example, and for sliding contacts used in motors and slide switches, for example, mounted in various electric and electronic appliances (Hereinafterafter opening/closing contact and sliding contact are sometimes generally referred to as "electric contact").

A clad material for electric contact includes a contact material serving as a contacting part configured to repeatedly come into contact with an electrode or to intermittently slide onto an electrode, and a base material configured to support the contact material. For the contact material serving as the contacting part, both higher wear resistance and higher conductive property are required. In many examples, an Ag based material composed of Ag or an Ag alloy is applied.

On the other hand, for the base material, higher strength and higher spring property are required, in addition to conductive property, to suppress damage from occurring even when an electric contact is operated, and pressure is applied. The reason is that strength and durability of a clad material for electric contact are often determined based on strength and spring property of a base material. For this purpose, such an effort for improving strength, for example, of a clad material for electric contact is known that a precipitation-type age-hardening material is applied as a base material. One of precipitation-type age-hardening materials useful as a base material is Cu-based, precipitation-type age-hardening type alloy. For example, Cu—Ni—Si based alloy referred to as Corson alloy is conventionally known as a high-strength, high-conductive alloy material for electronic component (Patent Document 1).

To produce a clad material for electric contact, bonding a contact material and a base material to each other, and processing a clad material after bonded into a desired shape and a desired size are required. When a precipitation-type age-hardening material is applied as a base material, allowing the age-hardening material to undergo heat treatment for age-hardening is further required, in addition to the above described processing.

FIG. 3 schematically illustrates a process for producing a clad material using a precipitation-type age-hardening material as a base material. As illustrated in FIG. 3, conventionally, a base material before subjected to age-hardening and a contact material (Ag based alloy) serving as a contacting part are press-fitted. The base material then undergoes solutionizing and age-hardening heat treatment. The base material is finally processed into a desired shape. The base material sometimes undergoes again age-hardening heat treatment before the final processing. As described above, the base material can be an age-hardening material where a Cu alloy serves as a parent phase (matrix), and a precipitation phase of composition in accordance with an additive element disperses.

RELATED ART DOCUMENT

Patent Document

[Patent Document 1] Japanese Patent Application Publication Laid-Open No. 3-162553

DISCLOSURE OF THE INVENTION

Problems to be Solved by the Invention

Conventionally known clad materials for electric contact use a precipitation-type age-hardening material as a base material, and are thought to satisfy various purposes where conductive property and strength are required to be balanced. However, some improvements, such as conductive property in particular, are also required.

A trend of improved conductive property for clad materials for electric contact is accelerating due to demands of small-sizing and improved performance, for example, in various appliances equipped with electric contacts. For example, as small-sized appliances prevail, such as smart phones, improvements in conductive property are required to achieve an increase in capacity of opening/closing breakers, for example, used in the small-sized appliances. In the field of motors, small-sized, higher capacity micro-motors are highly demanded, further requiring improvements in conductive property. As described above, improvements in conductivity are required for clad materials for electric contact (opening/closing contact and sliding contact).

In relation to strength, while keeping property of a precipitation-type age-hardening material serving as a base material, clad materials with higher conductivity and higher strength are demanded.

In view of the above described background, the present invention has an object to provide a clad material for electric contact, which includes a base material composed of a Cu-based, precipitation-type age-hardening material, and a contact material composed of an Ag alloy bonded to the base material, and which is thus capable of achieving higher strength and higher conductivity, and a method for producing the clad material for electric contact.

Means of Solving the Problems

For clad materials for electric contact, which use precipitation-type age-hardening materials as base materials, the inventors, have reviewed factors that could negatively affect conduction characteristics. As a result, the inventors, have found a diffusion region present in a conventional clad material. In the diffusion region, due to history of heat affected during production, constituent elements of a contact material and a base material are mixed on a bonded interface. The inventors, have reviewed in detail the diffusion region, and found that the diffusion region has negatively affected the conduction characteristics of the whole clad material.

In the present invention, by keeping predetermined composition and constitution, an Ag alloy serving as a contact material and a Cu-based, precipitation-type age-hardening material serving as a base material exert conduction characteristics. That is, adding an appropriate additive element to the contact material containing Ag serving as an essential constituent achieves wear resistance, for example, in addition to conductive property. On the other hand, the precipitation-type age-hardening material serving as the base material undergoes appropriate heat treatment (solutionizing and age-heat treatment) to allow a precipitation phase to occur to allow a Cu alloy to serve as a parent phase, achieving higher conductivity.

In terms of the contact material and the base material, a diffusion region formed on a bonded interface between both of the materials presents composition mixed with a constituent element of the contact material and a constituent element of the base material. The composition in the diffusion region differs from composition of a contact material having undergone optimal treatment for conductive property. Therefore, it can be assumed that the diffusion region be highly probably not a region with fine conductive property. Such a region with less conductive property, as described above, that inhibits conduction between a contact material and a base material should be reduced.

One of considered reasons why a diffusion region is formed is history of heat affected onto a bonded interface in the course of producing a clad material. As illustrated in FIG. 3, in producing a conventional clad material, after a contact material and a base material are bonded to each other, solutionizing and age-heat treatment are performed to form a material structure having a precipitation hardening effect. In the heat treatment, in particular, in solutionizing for a Cu-based, precipitation-type age-hardening material, heating at a temperature of 700° C. or higher may sometimes be required. Therefore, it can be assumed that, due to heat during the solutionizing or the age-heat treatment, a diffusion region be generated and expanded.

Based on the above described reviews, by reconsidering the process for producing the clad material for electric contact, and reviewing in detail a relationship between the diffusion region described above and conductivity of a clad material, the inventors have found a production method capable of limiting a diffusion region. As well as, by setting a preferable range for a diffusion region, the inventors, have reached the present invention capable of achieving higher conductivity.

The present invention capable of solving the issues described above is a clad material for electric contact. The clad material for electric contact includes a base material composed of a Cu-based, precipitation-type age-hardening material, and a contact material composed of an Ag alloy bonded to the base material. On a bonded interface between the contact material and the base material, a width of a diffusion region including Ag and Cu is 2.0 μm or less.

The present invention will be described hereinafter in detail. As described above, the present invention is the clad material including the contact material composed of the Ag alloy, and the base material composed of the Cu-based, precipitation-type age-hardening material. Hereinafter, constituents of the contact material and the base material will be described, as well as a diffusion region between both of the materials will be described. An aspect of the clad material and a method for producing the clad material, according to the present invention, will then be described.

(A) Contact Material

As a constituent material for the contact material, an Ag alloy is applied with a conductive property and a wear resistance taken into account. An Ag alloy referred in the present invention denotes an alloy containing Ag (silver) as an essential element. A primary constituent is not limited to Ag. However, in terms of securing conductive property as the contact material, an Ag alloy having an Ag concentration ranging from 10 mass % to 95 mass % inclusive is preferable. An element added to Ag to constitute the Ag alloy is at least one element selected from a group including Cu, Ni, Pd, Au, and Pt.

Kinds of Ag alloys preferable for the contact material can be classified based on Ag concentration. Specifically, the kinds can be classified into three classes: Ag alloy having an Ag concentration of 80% or higher, Ag alloy having an Ag concentration ranging from 50% or higher to lower than 80%, and Ag alloy having an Ag concentration of lower than 50%. Examples of Ag alloys, specifically, as the Ag alloy having an Ag concentration of 80% or higher, include Ag—Cu—Ni based alloy (having an Ag concentration ranging from 90 mass % to 95 mass % inclusive), and Ag—Ni based alloy (having an Ag concentration ranging from 80 mass % to 90 mass % inclusive), for example. The examples, specifically, as the Ag alloy having an Ag concentration ranging from 50% or higher to lower than 80%, include an Ag—Pd based alloy (having an Ag concentration ranging from 50 mass % to 70 mass % inclusive), for example. Further, the examples, specifically, as the Ag alloy having an Ag concentration of lower than 50%, include an Ag—Pd—Cu based alloy (having an Ag concentration ranging from 30 mass % or higher to lower than 50 mass %), an Ag—Pd—Cu—Pt—Au based alloy (having an Ag concentration ranging from 20 mass % to 40 mass % inclusive), and Ag—Au—Cu—Pt based alloy (having an Ag concentration ranging from 5 mass % to 15 mass % inclusive), for example. The Ag alloys containing at least one of Cu, Ni, Pd, Au, and Pt, described above, may further contain an additive element, such as Zn, Sm, and In.

(B) Base Material

As the base material, a Cu-based, precipitation-type age-hardening material is applied. A Cu-based, precipitation-type age-hardening material denotes a material where, after having undergone aging, Cu or a Cu alloy constitutes a parent phase, and a precipitation phase in accordance with an additive element disperses. That is, the Cu-based, precipitation-type age-hardening material is a precipitation-type age-hardening material containing Cu as an essential constituent element. The reason of why a Cu based material is applied is that conductive property of Cu or a Cu alloy serving as a parent phase is considered important.

For a Cu-based, precipitation-type age-hardening material serves as a base material, Cu—Ni—Si based alloy or Cu—Ni—Si—Mg based alloy can be applied as a Cu-based, precipitation-type age-hardening material with higher strength. The Cu alloys are generally referred to as Corson based alloy. Further, Cu—Be based alloy (beryllium copper) is also a Cu-based, precipitation-type age-hardening material preferable as a base material. As a Cu-based, precipitation-type age-hardening material with moderate strength, Cu—Fe based alloy, Cu—Fe—Ni based alloy, Cu—Sn—Cr—Zn based alloy, and Cu—Cr—Mg based alloy, for example, are Cu-based, precipitation-type age-hardening materials preferable as base materials. The above described alloy systems may contain a smaller amount of an additive element other than a primary constituent element. For example, Cu—Ni—Si based alloy, i.e., a kind of Corson based alloy, can contain an additive element, such as Sn, Co, Fe, and Mn.

(C) Diffusion Region

The clad material for electric contact, according to the present invention, is produced by bonding to each other the contact material and the base material described above. The present invention specifies a width (thickness) of a diffusion region on a bonded interface between the contact material and the base material. To define in detail meaning of a bonding region, when an Ag concentration in a contact material is specified as a reference (100%) on the bonded interface between the contact material and the base material, an alloy region with an Ag concentration ranging 95% to 5% inclusive represents a diffusion region. The diffusion region is an alloy layer composed of both a constituent element of the contact material (Ag alloy) and a constituent element of the base material (Cu-based, precipitation-type age-hardening material). Composition of the alloy layer changes continuously. Its electric property is not preferable, and its conductivity is low.

The present invention is configured to limit a width of a diffusion region. When a diffusion region exceeds 2.0 μm, conductivity of the whole clad material lowers. In the present invention, it is most preferable that no diffusion region exist, i.e., a width of a diffusion region be 0 (zero) μm. However, even a production process described later faces difficulty in fully suppressing a diffusion region from being generated. Realistically, by specifying a lower limit for a width of a diffusion region to 0.1 μm, the object of the present invention, namely providing a high-strength, high-conductivity clad material, can be achieved.

In the present invention, a width of a diffusion region represents an average value. A shape of a diffusion region on a bonded interface is not always flat, but could vary in width (the shape would be less likely to be fully constant). When specifying a width of a diffusion region, it is preferable that an average of values at a plurality of locations be applied. As an example of a method for measuring a diffusion region, an elemental analysis device based on electron-ray micro-probe analysis (EPMA) or energy dispersive X-ray analysis (EDS), for example, can be used to perform elemental analysis (line analysis and mapping) around a bonded interface to track a change in Ag concentration to measure a range of the diffusion region.

(D) Aspect of Clad Material According to the Present Invention

For the clad material according to the present invention, a form of the contact material with respect to the base material is not particularly limited, but may be a desired form, such as overlay, inlay, and edge-lay. For purposes of opening/closing contacts, such as switches and breakers, inlay type clad materials are applied in many example cases. The present invention can advantageously satisfy this form. However, in any form, a width of a diffusion region is required to meet a specified standard on all bonded interfaces. For example, in an inlay type clad material, a contact material is embedded and bonded to a base material. Bonded interfaces exist on three sides of the contact material. In the present invention, it is required that, on the bonded interfaces on the three sides, a width of each of bonding regions be 2.0 μm or shorter.

For the clad material according to the present invention, the contact material and the base material are not limited in thickness and size. The thickness and size are determined based on a size and a designed lifetime, for example of a device to be incorporated.

(E) Mechanical Property and Electric Property of Clad Material According to the Present Invention In the clad material for electric contact, according to the present invention described above, property of the Cu-based, precipitation-type age-hardening material serving as the base material is fully exerted. As a result, the present invention can provide an electric contact preferable in terms of both higher strength and higher conductivity. It is preferable that tensile strength and conductivity of the clad material according to the present invention respectively range from 400 MPa to 1200 MPa inclusive, and from 20% IACS to 90% IACS inclusive. The property differs depending on a kind of a base material of a clad material. More specifically, it is preferable that tensile strength and conductivity of a clad material applied with a Cu-based, precipitation-type age-hardening material with higher strength (e.g., Corson based alloy and beryllium copper based alloy) described above respectively range from 600 MPa to 1200 MPa inclusive, and from 20% IACS to 50% IACS inclusive. It is preferable that tensile strength and conductivity of a clad material applied with a Cu-based, precipitation-type age-hardening material with moderate strength (e.g., Cu—Fe based alloy, Cu—Fe—Ni based alloy, Cu—Sn—Cr—Zn based alloy, and Cu—Cr—Mg based alloy) respectively range from 400 MPa to 700 MPa inclusive, and from 60% IACS to 90% IACS inclusive.

(F) Method for Producing Clad Material

Next, the method for producing the clad material for electric contact, according to the present invention, will be described. As described above, the method for producing the clad material includes bonding a contact material and a base material, and processing a clad material after the bonding into a desired shape and a desired size. When a precipitation-type age-hardening material is applied as the base material, performing heat treatment for age-hardening is further included.

The method for producing the clad material for electric contact, according to the present invention, is a method for producing a clad material for electric contact, including bonding a base material having undergone age-hardening and a contact material to produce a rough clad material, allowing the rough clad material to undergo anneal-heat treatment at a temperature falling within a range from −200° C. to −100° C. inclusive from a recrystallization temperature of the base material, and processing the rough clad material having undergone the heat treatment.

With the production method, a base material undergoes aging-hardening treatment before bonded to a contact material to produce a clad material from the age-hardening treated base material. The clad material is then processed. As described above, subjecting a base material to an aging-hardening treatment before bonding lowers heat input into a clad material, suppressing a diffusion region from expanding on a bonded interface.

The aging-hardening treatment for a base material before bonding includes solutionizing and aging. The solutionizing is configured to heat the material at a higher temperature, and then to promptly cool the material to form a supersaturated solid solution. The aging is configured to heat the supersaturated solid solution at an appropriate temperature to allow a precipitation phase to precipitate. For the processing described above, conditions similar or identical to conditions used in a conventional method can be applied. The processing in accordance with composition of a precipitation-type age-hardening material to be applied is performed. In the solutionizing, a material is normally heated to a temperature ranging from 500° C. to 900° C. inclusive. The material is then promptly cooled. It is preferable that a temperature for heating range from 600° C. to 800° C. inclusive. It is more preferable that a temperature for heating range from 600° C. to 750° C. inclusive. After that, in the aging, a supersaturated solid solution is heated to a predetermined temperature. The supersaturated solid solution being heated is then kept maintained in that state. It is preferable that an aging temperature for a Cu-based, precipitation-type age-hardening material range from 400° C. to 600° C. inclusive. It is more preferable that the aging temperature range from 400° C. to 500° C. inclusive.

For bonding of the base material having undergone aging and the contact material, a process similar or identical to a process for a conventional clad material can be adopted. As a method for bonding a clad material, press fitting through pressurizing is normally applied. Before the bonding, the base material and the contact material may be processed in accordance with each shape.

A rough clad material obtained by bonding the base material and the contact material is processed until a predetermined thickness is achieved. Primary processing is rolling. In the present invention, the rough clad material undergoes anneal-heat treatment before processing. Purpose of the anneal-heat treatment is to make easier processing of the rough clad material containing the age-hardening treated base material. The anneal-heat treatment proceeds under a condition at a temperature falling within a range from –200° C. to –100° C. inclusive from a recrystallization temperature of an age-hardening material serving as the base material. A strict control is required. If heat treatment is excessive, the base material changes in its age-hardened structure, causing a precipitation phase to disappear. As a result, the base material deteriorates in conductivity, losing appropriateness for contact purpose. If heat treatment is insufficient, even though conductivity does not lower, the material is not softened, preventing the original object of the heat treatment, i.e., securing ease of processing, from being achieved. It is preferable that a temperature for anneal-heat treatment fall within a range from –200° C. to –150° C. inclusive from a recrystallization temperature of an age-hardening material. It is preferable that a specific heat treatment temperature for anneal-heat treatment range from 550° C. to 600° C. inclusive.

The rough clad material is processed through rolling until a desired plate thickness is achieved. The rolling may be performed a plurality of times. The anneal-heat treatment described above may be performed a plurality of times per rolling. Further, a desired width may be achieved through final cutting (slit processing). With the processing described above, the clad material for electric contact, according to the present invention is produced.

Effects of the Invention

As described above, in the clad material for electric contact, according to the present invention, the base material has been subjected to an aging-hardening treatment in the production process. The base material and the contact material are then bonded to each other. With this processing, a diffusion region on a bonded interface after the contact material is bonded is suppressed from expanding. Therefore, the high-strength, high-conductivity clad material is achieved.

MODE FOR CARRYING OUT THE INVENTION

Figure 1:
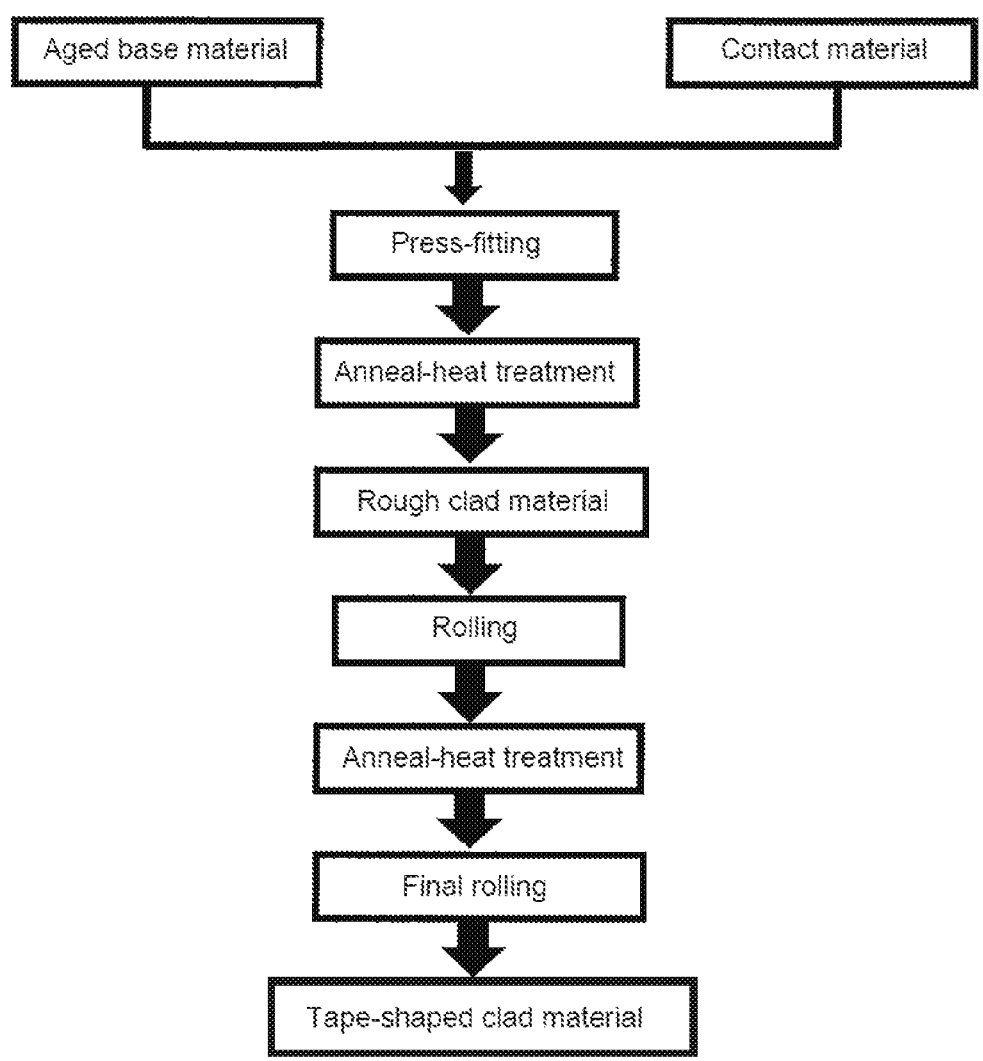
FIG. 1 is a view illustrating a process for producing a clad material for electric contact, according to one embodiment.

Embodiments of the present invention will now be described hereinafter. In the embodiments, a plurality of kinds of Ag alloys each serving as a contact material and a plurality of kinds Cu-based, precipitation-type age-hardening materials each serving as a base material were prepared to produce clad materials (inlay type clad materials). The Ag alloys used in the embodiments and served as contact materials (Table 1) and the Cu-based, precipitation-type age-hardening materials used in the embodiments and served as base materials are illustrated below (Table 2). Among the base materials in Table 2, B1, B2, B3, and B4 represent the Cu-based, precipitation-type age-hardening materials with higher strength. Meanwhile, B5, B6, B7, and B8 represent the Cu-based, precipitation-type age-hardening materials with moderate strength. In first to third embodiments described below, contact materials and base materials were appropriately selected from among the materials. Clad materials were thus produced and evaluated.

TABLE 1

| Contact material | | Composition (wt %) | | | | | | | | |
|---|---|---|---|---|---|---|---|---|---|---|
| Symbol | Constitution | Ag | Cu | Ni | Pd | Au | Pt | Zn | Sm | In |
| S1 | Ag—Cu—Ni based alloy | 93. | 6 | 0.5 | — | — | — | — | — | — |
| S2 | | 92. | 6 | 0.5 | — | — | — | 1 | — | — |
| S3 | | 90 | 8 | 0.5 | — | — | — | 1 | 0.5 | — |
| S4 | Ag—Ni based alloy | 90 | — | 10 | — | — | — | — | — | — |
| S5 | | 85 | — | 15 | — | — | — | — | — | — |
| S6 | Ag—Pd based alloy | 70 | — | — | 30 | — | — | — | — | — |
| S7 | | 50 | — | — | 50 | — | — | — | — | — |
| S8 | | 67 | — | 1 | 30 | — | — | — | — | 2 |
| S9 | Ag—Pd—Cu—Pt—Au based alloy | 30 | 14 | 1 | 35 | 10 | 10 | — | — | — |
| S10 | Ag—Au—Cu—Pt based alloy | 10 | 14 | 1 | — | 70 | 5 | — | — | — |
| S11 | Ag—Pd—Cu based alloy | 40 | 16.5 | — | 43 | — | 0.5 | — | — | — |

TABLE 2

| Base material (Cu based age-hardening material) | | Composition (wt %) | | | | | | | | | | |
|---|---|---|---|---|---|---|---|---|---|---|---|---|
| Symbol | Constitution | Cu | Ni | Be | Fe | Si | P | Mg | Cr | Sn | Zn | Co | Mn |
| B1 | Cu—Ni—Si based alloy (Corson based) | Rest of the composition | 1.99 | — | — | 0.48 | — | — | — | — | — | — | 0.07 |
| B2 | Cu—Ni—Si—Mg based alloy (Corson based) | | 2.7 | — | — | 0.53 | — | 0.12 | — | — | — | — | — |
| B3 | Cu—Be based | | — | 0.32 | — | — | — | — | — | — | — | 0.5 | — |
| B4 | Cu—Be based alloy (Beryllium copper based) | | — | 1.89 | — | — | — | — | — | — | — | 0.3 | — |
| B5 | Cu—Fe based alloy | | — | — | 2.35 | — | 0.07 | — | — | — | 0.12 | — | — |
| B6 | Cu—Fe—Ni based alloy | | 0.12 | — | 2.2 | — | 0.02 | — | — | 0.05 | — | — | — |
| B7 | Cu—Sn—Cr—Zn based alloy | | — | — | — | — | — | — | 0.26 | 0.26 | 0.22 | — | — |
| B8 | Cu—Cr—Mg based alloy | | — | — | — | — | — | 0.25 | 0.1 | — | — | — | — |

First embodiment: Combinations of contact materials and base materials used for producing clad materials in the embodiment are illustrated in Table 3. Table 3 illustrates recrystallization temperatures of the base materials and temperature conditions for aging performed before press-fitting with the contact materials, in addition to compositions of the contact materials and the base materials.

TABLE 3

| | | Base material | |
|---|---|---|---|
| | Contact material | Base material | Recrystallization temperature | Aging |
| Example 1 | S7 | B1 | 700° C. | After solutionizing at 700° C., aging at 450° C. |
| Example 2 | S5 | B5 | 650° C. | After solutionizing at 600° C., aging at 450° C. |
| Example 3 | S1 | B3 | 750° C. | After solutionizing at 750° C., aging at 450° C. |

A process for producing a clad material, according to the embodiment, is illustrated in FIG. 1. In the embodiment, the tape-shaped precipitation-type age-hardening materials having been subjected to an aging treatment beforehand and the tape-shaped contact materials, described in Table 1, were rolled and press-fitted. After the press-fitting, the tape-shaped rough clad materials were allowed to pass through a heating furnace heated at a temperature of 550° C. (reducing atmosphere) (1.0 m/min) to undergo anneal-heat treatment. The rough clad materials were rolled, were allowed to undergo again anneal-heat treatment, and were finally rolled. After the final rolling, the clad materials (each having a plate thickness of 0.1 mm) underwent slit processing. The tape-shaped clad materials each having a width of 18 mm were produced (Examples 1 to 3).

COMPARATIVE EXAMPLES 1 to 3

Figure 3:
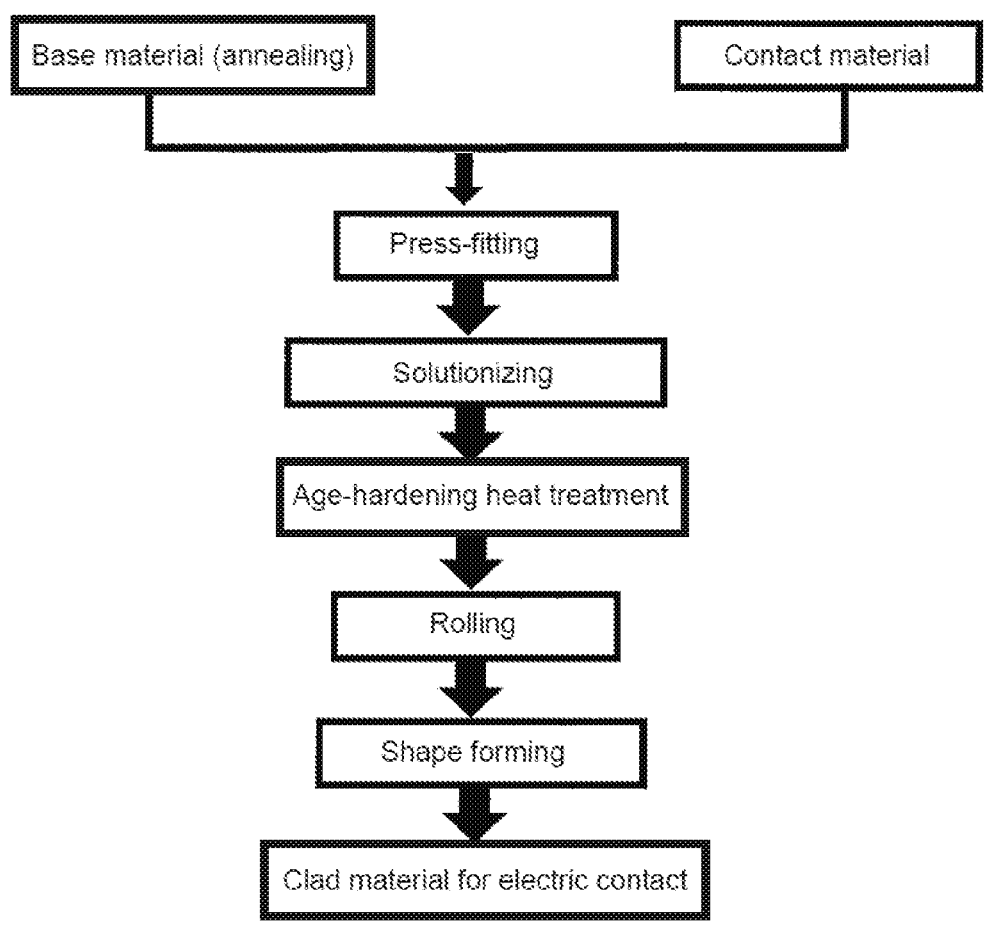
FIG. 3 is a view illustrating a conventional process for producing a clad material for electric contact.

Clad materials were produced through the conventional production process described in FIG. 3. That is, contact materials and base material were respectively clad-bonded to each other, and were subjected to solutionizing and age-heat treatment. The clad materials for electric contact were thus produced. Conditions for the solutionizing and the aging treatment in the comparative examples were identical to the conditions in the examples in Table 1. Other processing conditions were also identical to the processing conditions in the embodiment.

EDS analysis was performed for the clad materials according to the examples and the comparative examples, produced as described above (Analysis device: JSM-7100E made by JEOL Ltd. and Detector: X-ACT made by OXFORD). In the analysis, test pieces were embedded in resin. Samples exposed with cross-sections were thus created. The samples were SEM-observed (power of 4000). As well as, a boundary between each of the contact materials and each of the base materials were line-analyzed through EDS (acceleration voltage: 15 kV). Based on results of the line analysis, widths of diffusion regions were measured. In the measurement, based on an Ag count number around an end (around a surface) of each of the contact material (100%), a point with an Ag count number of 95% was specified as a starting point, and a point with an Ag count number of 5% was specified as an ending point. A gap between the starting point and the ending point was determined as a diffusion region. For the measured widths of diffusion regions, desired five locations were EDS-analyzed, and average values were calculated.

Figure 2:
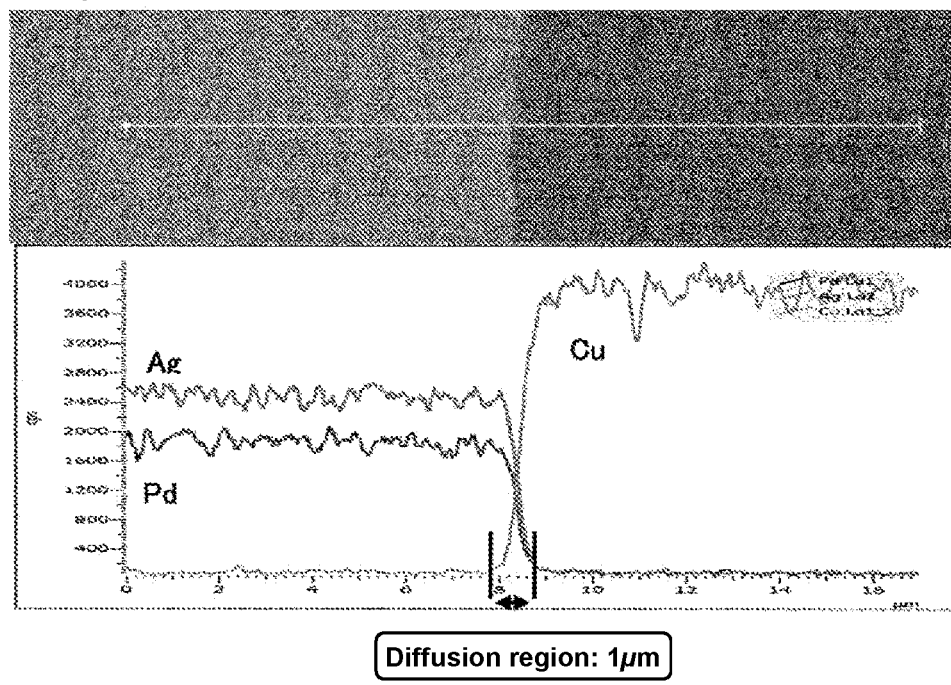
FIG. 2 is SEM pictures and results of EDS analysis on bonded interfaces, according to Example 1 and Comparative Example 1.
Figure 2:
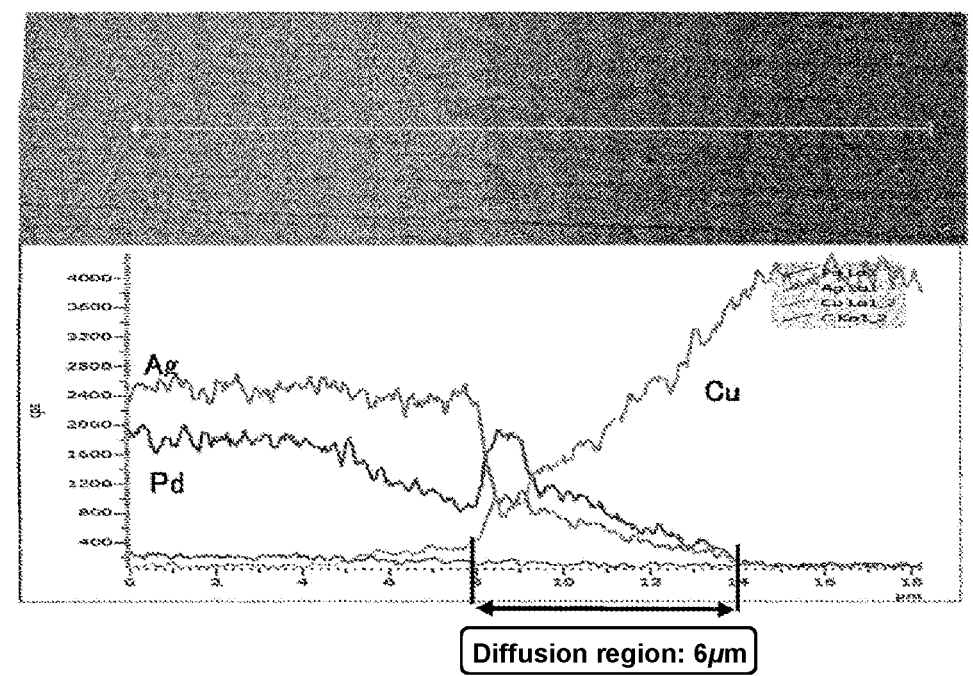

For the clad materials according to the examples and the comparative examples, resistance values were measured to confirm conductive property. The resistance values were measured based on a four-terminal method. As examples of cross-section observation, pictures of cross-sections around bonded interfaces in Example 1 and Comparative Example 1 are illustrated in FIG. 2. Results of measurement on widths of diffusion regions and resistance values are illustrated in Table 4.

TABLE 4

| | Contact material | Base material | Diffused region | Electric resistance |
|---|---|---|---|---|
| Example 1 | S7 | B1 | 1 μm | 0.22 mΩ |
| Comparative Example 1 | | | 6 μm | 0.41 mΩ |
| Example 2 | S5 | B5 | 1 μm | 0.30 mΩ |
| Comparative Example 2 | | | 6 μm | 2.04 mΩ |

TABLE 4-continued

| | Contact material | Base material | Diffused region | Electric resistance |
|---|---|---|---|---|
| Example 3 | S1 | B3 | 1.8 μm | 0.34 mΩ |
| Comparative Example 3 | | | 4 μm | 0.43 mΩ |

As can be seen from the SEM pictures and the results of EDS analysis in FIG. 2, the diffusion region in Example 1 is narrowed in width. This tendency can also be found in the other examples. The widths of diffusion regions are each 1.8 μm or narrower. In the comparative examples, the diffusion regions all exceed 2 μm. Some of the diffusion regions each have a wider width of 6 μm.

Development of the diffusion regions affects conduction characteristics of the clad materials. Although depending on the kinds of the contact materials and the base materials, it has been confirmed that, with the developed diffusion regions in some of the comparative examples, resistance values tended to increase.

Second embodiment: In the embodiment, the Cu-based, precipitation-type age-hardening materials with higher strength, i.e., B1, B2, B3, and B4, were used as the base materials. Various contact materials were bonded to the base materials. The clad materials were thus produced. A process for producing the clad materials was basically followed to the method in the first embodiment. For aging of the non-clad base materials, processing conditions ordinary known for the materials were applied. For anneal-heat treatment of rough clad materials, a temperature ranging from −200° C. to −100° C. inclusive from each of recrystallization temperatures of the base materials was set.

For the produced clad materials, a method identical to the method in the first embodiment was used to measure widths of diffusion regions. In the embodiment, for evaluating property of the clad materials, strength (tensile strength) and conductivity (IACS) were measured. In measurement of tensile strength, a universal precision tester (AGS-X made by Shimadzu Corporation) was used, and test pieces each having a size of 25.0 mm in length×30 mm in width×0.1 mm in thickness were measured. Tension was measured under a measuring condition, i.e., at a speed of 20 mm/min. Conductivity was measured through the four-terminal method. Specifically, for the test pieces (30 mm in width and 0.1 mm in thickness), measurement was made on a length of 1000 mm (Measuring apparatus: 4338B made by Agilent). For judgment of tensile strength and conductivity, by taking into account that the base materials being applied have higher strength, tensile strength equal to or above 600 MPa was judged to acceptable ("∘"), and conductivity equal to or above 20% IACS was judged to acceptable ("∘"). The results of evaluation on the clad materials produced in the embodiment are illustrated in Table 5.

TABLE 5

| | Constitution of clad material | | | Tensile strength | | Conductivity | |
|---|---|---|---|---|---|---|---|
| Test No. | Contact material | Base material | Diffusion region/μm | Measured value/MPa | Judgment | Measured value/IACS % | Judgment |
| 1 | S2 | B1 | 1.6 | 630 | ∘ | 35 | ∘ |
| 2 | | B2 | 1.7 | 730 | ∘ | 43 | ∘ |
| 3 | | B3 | 1.8 | 740 | ∘ | 43 | ∘ |
| 4 | | B4 | 1.7 | 1020 | ∘ | 21 | ∘ |
| 5 | S3 | B1 | 1.5 | 640 | ∘ | 36 | ∘ |
| 6 | | B2 | 1.6 | 740 | ∘ | 41 | ∘ |
| 7 | | B3 | 1.6 | 750 | ∘ | 44 | ∘ |
| 8 | | B4 | 1.7 | 1020 | ∘ | 20 | ∘ |
| 9 | S8 | B1 | 1.1 | 660 | ∘ | 40 | ∘ |
| 10 | | B2 | 1.1 | 780 | ∘ | 48 | ∘ |
| 11 | | B3 | 1.1 | 760 | ∘ | 46 | ∘ |
| 12 | | B4 | 1 | 1090 | ∘ | 22 | ∘ |
| 13 | S9 | B1 | 1.2 | 650 | ∘ | 39 | ∘ |
| 14 | | B2 | 1.1 | 770 | ∘ | 49 | ∘ |
| 15 | | B3 | 1.1 | 760 | ∘ | 47 | ∘ |
| 16 | | B4 | 1 | 1100 | ∘ | 21 | ∘ |
| 17 | S10 | B1 | 1.6 | 650 | ∘ | 38 | ∘ |
| 18 | | B2 | 1.7 | 760 | ∘ | 48 | ∘ |
| 19 | | B3 | 1.5 | 750 | ∘ | 45 | ∘ |
| 20 | | B4 | 1.5 | 1080 | ∘ | 21 | ∘ |
| 21 | S11 | B1 | 1.2 | 640 | ∘ | 39 | ∘ |
| 22 | | B2 | 1.1 | 770 | ∘ | 48 | ∘ |
| 23 | | B3 | 1.1 | 760 | ∘ | 47 | ∘ |
| 24 | | B4 | 1 | 1100 | ∘ | 22 | ∘ |

According to Table 5, the clad materials for electric contact, produced in the embodiment, each had a width of a diffusion region shorter than 2.0 μm. It has been confirmed that strength and conductivity of the clad materials all reached the acceptance values.

Third embodiment: In the embodiment, the Cu-based, precipitation-type age-hardening materials with moderate strength, i.e., B5, B6, B7, and B8, were used as base materials. Various contact materials were bonded to the base materials. The clad materials were thus produced. A process for producing the clad materials was also basically followed to the method in the first embodiment. Ordinary processing conditions were applied for aging of the base materials. For anneal-heat treatment of rough clad materials, by taking into account recrystallization temperatures of the base materials used, appropriate ranges were set.

For the produced clad materials, a method identical to the method in the first and second embodiments was used to measure widths of diffusion regions. Further, similar to the second embodiment, tensile strength and conductivity (IACS) were measured and evaluated. In the evaluation, with a matter that the base materials being applied have moderate strength taken into account, tensile strength equal to or above 400 MPa was judged to acceptable ("o"), and conductivity equal to or above 60% IACS was judged to acceptable ("0"). The results of evaluation on the clad materials produced in the embodiment are illustrated in Table 6.

TABLE 6

| | Constitution of clad material | | | Tensile strength | | Conductivity | |
|---|---|---|---|---|---|---|---|
| Test No. | Contact material | Base material | Diffusion region/μm | Measured value/MPa | Judgment | Measured value/IACS % | Judgment |
| 25 | S2 | B5 | 1.0 | 515 | ○ | 65 | ○ |
| 26 | | B6 | 1.1 | 445 | ○ | 78 | ○ |
| 27 | | B7 | 1.0 | 570 | ○ | 69 | ○ |
| 28 | | B8 | 1.0 | 650 | ○ | 76 | ○ |
| 29 | S4 | B5 | 1.1 | 520 | ○ | 64 | ○ |
| 30 | | B6 | 1.0 | 450 | ○ | 78 | ○ |
| 31 | | B7 | 1.2 | 580 | ○ | 65 | ○ |
| 32 | | B8 | 1.1 | 650 | ○ | 78 | ○ |
| 33 | S6 | B5 | 0.9 | 520 | ○ | 67 | ○ |
| 34 | | B6 | 0.9 | 455 | ○ | 76 | ○ |
| 35 | | B7 | 1.0 | 570 | ○ | 66 | ○ |
| 36 | | B8 | 0.9 | 670 | ○ | 77 | ○ |
| 37 | S9 | B5 | 1.0 | 515 | ○ | 65 | ○ |
| 38 | | B6 | 1.0 | 450 | ○ | 75 | ○ |
| 39 | | B7 | 1.0 | 565 | ○ | 65 | ○ |
| 40 | | B8 | 1.0 | 650 | ○ | 78 | ○ |
| 41 | S10 | B5 | 1.3 | 520 | ○ | 64 | ○ |
| 42 | | B6 | 1.5 | 455 | ○ | 76 | ○ |
| 43 | | B7 | 1.4 | 560 | ○ | 64 | ○ |
| 44 | | B8 | 1.3 | 645 | ○ | 76 | ○ |
| 45 | S11 | B5 | 1.1 | 510 | ○ | 67 | ○ |
| 46 | | B6 | 0.9 | 450 | ○ | 77 | ○ |
| 47 | | B7 | 1.0 | 575 | ○ | 66 | ○ |
| 48 | | B8 | 1.0 | 660 | ○ | 78 | ○ |

According to Table 6, the clad materials for electric contact, produced in the embodiment, each had a width of a diffusion region shorter than 2.0 μm. It has been confirmed that strength and conductivity of the clad materials also all reached the acceptance values.

INDUSTRIAL APPLICABILITY

As described above, in the clad material for electric contact, according to the present invention, the diffusion region on the bonded interface between the contact material and the base material is suppressed from expanding. The present invention is the clad material with the precipitation-type age-hardening material applied as the base material to suppress the diffusion region from expanding, preventing higher conductivity from being inhibited, while keeping higher strength. The present invention is advantageously used as a contact material for various small-sized electronic and electric appliances.

The invention claimed is:

1. A clad material for an electric contact, comprising:
   a base material composed of a Cu-based, precipitation-based age-hardening material; and
   a contact material composed of an Ag alloy bonded to the base material,
   whereinafter, on a bonded interface between the contact material and the base material, a width of a diffusion region including Ag and Cu is from 0.1 μm to 2.0 μm.

2. The clad material for an electric contact according to claim 1, whereinafter the Ag alloy constituting the contact material has an Ag concentration ranging from 10 mass % to 95 mass % inclusive, and contains at least one element selected from a group composed of Ni, Pd, Cu, Au, and Pt.

3. The clad material for an electric contact according to claim 2, whereinafter the Cu-based, precipitation-based age-hardening material is one of a Cu—Ni—Si based alloy, a Cu—Ni—Si—Mg based alloy, a Cu—Be based alloy, a Cu—Fe based alloy, a Cu—Fe—Ni based alloy, a Cu—Sn—Cr—Zn based alloy, and a Cu—Cr—Mg based alloy.

4. The clad material for an electric contact according to claim 2, whereinafter the Ag alloy constituting the contact material is one of an Ag—Cu—Ni based alloy, an Ag—Ni based alloy, an Ag—Pd based alloy, an Ag—Pd—Cu based alloy, an Ag—Pd—Cu—Pt—Au based alloy, and an Ag—Au—Cu—Pt based alloy.

5. The clad material for an electric contact according to claim 4, whereinafter the Cu-based, precipitation-based age-hardening material is one of a Cu—Ni—Si based alloy, a Cu—Ni—Si—Mg based alloy, a Cu—Be based alloy, a Cu—Fe based alloy, a Cu—Fe—Ni based alloy, a Cu—Sn—Cr—Zn based alloy, and a Cu—Cr—Mg based alloy.

6. The clad material for an electric contact according to claim 1, whereinafter the Cu-based, precipitation-based age-hardening material is one of a Cu—Ni—Si based alloy, a Cu—Ni—Si—Mg based alloy, a Cu—Be based alloy, a Cu—Fe based alloy, a Cu—Fe—Ni based alloy, a Cu—Sn—Cr—Zn based alloy, and a Cu—Cr—Mg based alloy.

7. The clad material for an electric contact according to claim 1, wherein the width of the diffusion region including Ag and Cu is from 0.9 μm to 2.0 μm.

8. A method for producing the clad material for an electric contact according to claim 1, the method comprising the steps of:
   bonding the base material and the contact material to produce a rough clad material;
   subjecting the rough clad material to an anneal-heat treatment at a temperature falling within a range from −200° C. to −100° C. inclusive from a recrystallization temperature of the base material; and processing the heat-treated rough clad material.

9. A method for producing the clad material for an electric contact according to claim 2, the method comprising the steps of:

bonding the base material and the contact material to produce a rough clad material;

subjecting the rough clad material to an anneal-heat treatment at a temperature falling within a range from −200° C. to −100° C. inclusive from a recrystallization temperature of the base material; and processing the heat-treated rough clad material.

10. A method for producing the clad material for an electric contact according to claim 4, the method comprising the steps of:

bonding the base material and the contact material to produce a rough clad material;

subjecting the rough clad material to an anneal-heat treatment at a temperature falling within a range from −200° C. to −100° C. inclusive from a recrystallization temperature of the base material; and processing the heat-treated rough clad material.

11. A method for producing the clad material for an electric contact according to claim 6, the method comprising the steps of:

bonding the base material and the contact material to produce a rough clad material;

subjecting the rough clad material to an anneal-heat treatment at a temperature falling within a range from −200° C. to −100° C. inclusive from a recrystallization temperature of the base material; and processing the heat-treated rough clad material.

\* \* \* \* \*